3,203,937
CROSS-LINKING ETHYLENE POLYMERS
David S. Breslow and Harold M. Spurlin, Wilmington, Del., assignors to Hercules Powder Company, Wilmington, Del., a corporation of Delaware
No Drawing. Filed Mar. 15, 1961, Ser. No. 95,821
The portion of the term of the patent subsequent to October 16, 1979, has been disclaimed
12 Claims. (Cl. 260—79.3)

This invention relates to cross-linking polymers and to the vulcanizates so produced. More particularly, the invention relates to cross-linking ethylene polymers with aromatic polysulfonazides and to the vulcanizates so produced.

In the past the rubber industry has depended almost entirely on sulfur, sulfur-bearing materials, and peroxides as vulcanizing, i.e., cross-linking agents. These agents are not, however, effective in covulcanizing blends of ethylene polymers with other polymers. It has more recently been discovered that certain sulfonazides are capable of acting as vulcanizing agents. However, these prior art sulfonazides are not readily soluble in hydrocarbon solvents, and they give a blown, i.e., a foamed product.

Now, in accordance with this invention it has been found that ethylene polymers can be cross-linked by heating in the presence of an aromatic polysulfonazide having a solubility of at least about 1.0% by weight in n-heptane at a temperature of 95° C. to give an unblown vulcanizate that is tough, resilient, solvent resistant, and odor free. In addition, blends of these ethylene polymers with other polymers can be covulcanized in accordance with this invention to give products which are useful in the rubber tire industry.

As stated above, any aromatic polysulfonazide having a solubility in n-heptane at a temperature of 95° C. of at least about 1.0% by weight can be used in the process of this invention. Those aromatic polysulfonazides having a lower solubility are to be avoided since they cause blowing. The aromatic polysulfonazide will contain at least 2 sulfonazide groups but may contain up to 100 or more nonadjacent sulfonazide groups. In all cases the sulfonazide groups will be attached directly to the aromatic ring or rings. In addition to the sulfonazide groups, these compounds can also contain ether, ester, alcohol, halogen, etc., groups which are inert to the cross-linking reaction. Exemplary aromatic polysulfonazides are 1,3-benzene bis(sulfonazide), 1-octyl-2,4,6-benzene tris(sulfonazide), 3,5-toluene bis(sulfonazide), 1,6-bis(4'-sulfonazidophenyl) hexane, 1-methoxy benzene-3,5-bis(sulfonazide), 4,4'-bis(octadecyl) biphenyl-3,5,3',5'-tetra(sulfonazide), 1-dodecylnaphthalene 3,6 - bis(sulfonazide), etc.

Any polymer, homopolymer, or copolymer containing at least about 25 mole percent of ethylene can be cross-linked by the process of this invention. Exemplary of the polymers that can be cross-linked are high and low density polyethylene, ethylene - propylene copolymers, ethylene - vinyl acetate copolymers, ethylene - butylene copolymers, ethylene - propylene - diene terpolymers such as ethylene-propylene-butadiene terpolymers, ethylene-propylene-isoprene terpolymers, etc. (containing no more than about 10 mole percent of the diene). In addition, any one of these polymers can be blended with another polymer and covulcanized.

The cross-linking process of this invention can be carried out by heating the ethylene polymer in the presence of the aromatic polysulfonazide to a temperature at which the sulfonazide decomposes. This temperature varies over a wide range, but in general will be in the range of from about 120° C. to about 250° C. Various amounts of the cross-linking agent can be added, the optimum amount depending on the amount of cross-linking desired, the specific aromatic polysulfonazide employed, etc. In general, the amount added, based on the weight of the ethylene polymer, will be from about 0.1% to about 20%.

The cross-linking agent can be incorporated with the ethylene polymer in any desired fashion; for example, it can be uniformly blended by simply milling on a conventional rubber mill or dissolved in a solution containing the polymer. By either means the aromatic polysulfonazide is distributed throughout the polymer and uniform cross-linking is effected when the blend is subjected to heat. Other methods of mixing the cross-linking agent with the polymer will be apparent to those skilled in the art.

In addition to the cross-linking agent, other ingredients can also be incorporated. The additive commonly used in rubber vulcanizates can be used here also, as, for example, extenders, fillers, pigments, plasticizers, stabilizers, etc. Exemplary of the fillers that can be added are calcium carbonate, iron oxide, carbon black, silica, calcium silicate (hydrated), alumina, etc. The presence of a filler, and in particular carbon black, is beneficial in some cases. Obviously, there are many cases in which a filler is not required or desired and excellent results are achieved when only the cross-linking agent is added.

The following examples are presented for purposes of illustration, parts and percentages being by weight unless otherwise specified. The molecular weight of the polymers vulcanized in these examples is indicated by the reduced specific viscosity (RSV) given for each. By the term "reduced specific viscosity" is meant the $\eta_{sp/c}$ determined on a 0.1% solution (0.1 g. of the polymer per 100 ml. of solution) of the polymer in decahydronaphthalene at a temperature of 135° C.

The extent of cross-linking is determined by analysis for percent gain in insolubility in solvents in which the uncross-linked polymer is soluble, hereinafter termed "percent gel."

Percent gel is determined as follows: A weighed sample of polymer is soaked in a specified solvent for a specified length of time. The sample is then removed and dried to constant weight. The weights of initial and final sample are corrected for polymer and copolymer content based on knowledge of components. From these figures $$\frac{\text{Corrected dry weight}}{\text{Corrected initial weight}} \times 100 = \text{percent gel}$$

EXAMPLE 1

Two samples of an ethylene-propylene copolymer containing 33 mole percent of ethylene and having an RSV of 3.3 were cross-linked with aromatic polysulfonazides of different solubilities and the properties of the two vulcanizates compared. One sample, designated Sample A, was cross-linked with 1,3-benzene bis(sulfonazide) while the other, designated Sample B, was cross-linked with p,p'-diphenyl bis(sulfonazide).

Each sulfonazide was prepared by reacting the respective disulfonyl chloride with sodium azide. The 1,3-benzene bis(sulfonazide) had a solubility of 2% by weight in n-heptane at a temperature of 95° C. and a half-life of 11 minutes at a temperature of 157° C. The p,p'-diphenyl bis(sulfonazide) had a solubility of 0.22% by weight in n-heptane at a temperature of 95° C. and a half-life of 20 minutes at a temperature of 157° C.

To each 100 parts of polymer were added 5 parts of cross-linking agent and 70 parts of high abrasion furnace black. Each mixture was then blended on a 2-roll mill at a temperature of 75° C. for 10 minutes and cured between steel plates under a pressure of 1000 p.s.i. for 60 minutes at a temperature of 177° C. The resulting vulcanizate of Sample A was a tough, strong rubber with no signs of blowing or blistering. The resulting vulcanizate of Sample B contained excessive surface blisters and internal porosity, i.e., blowing, so that tensile specimens could not be prepared. Sample A exhibited the following properties:

| | |
|---|---:|
| Tensile strength _____p.s.i__ | 2550 |
| Modulus at 300% elongation _____p.s.i__ | 2170 |
| Elongation _____percent__ | 350 |
| Hardness, shore A-2 _____ | 72 |
| Miniature Graves tear strength at room temperature _____lbs./in__ | 192 |

EXAMPLE 2

Two samples of an ethylene-propylene copolymer containing approximately 70 mole percent of ethylene and having an RSV of 3.0 were cross-linked with different aromatic sulfonazides and the extent of cross-linking, as shown by percent gel, compared. One sample, designated Sample A, was cross-linked with p-toluene sulfonazide while the other, designated Sample B, was cross-linked with 1,3-benzene bis(sulfonazide). In each run 2.6 parts of polymer were dissolved in 147 parts of trichloroethylene and 0.13 part of cross-linking agent added. Then the solvent was allowed to evaporate from each solution overnight at room temperature. Each sample was cured by heating in a closed iron mold for 25 minutes at a temperature of 175–180° C. The cross-linking agent added to each sample and the percentage gel, as determined by soaking in toluene at a temperature of 100° C. for 60 minutes, are tabulated below.

| | Sample A | Sample B |
|---|---|---|
| Cross-linking Agent_____ | p-Toluene Sulfonazide. | 1,3-Benzene bis (Sulfonazide). |
| Percent Gel_____ | 0_____ | 80. | thalene at a temperature of 135° C. and had a tensile strength of 3660 p.s.i.

EXAMPLES 5–6

Two samples of an ethylene-propylene copolymer containing 69 mole percent of ethylene and having an RSV of 3.6 were blended with different fillers and cross-linked with 1,3-benzene bis(sulfonazide) as follows: To each 100 parts of polymer were added 50 parts of filler, 5 parts of zinc oxide, 1 part of stearic acid, and 5 parts of 1,3-benzene bis(sulfonazide). Each mixture was blended on a 2-roll mill at a temperature of 80° C. for 10 minutes and then cured under a pressure of 1000 p.s.i. between steel plates for 60 minutes at a temperature of 177° C. The fillers used and the properties of the vulcanizates are tabulated below.

| Examples | Filler | Tensile Strength, p.s.i. | Elongation at Break, percent |
|---|---|---|---|
| 5_____ | Super abrasion furnace black____ | 2,855 | 645 |
| 6_____ | Easy processing channel black__ | 2,630 | 610 |

EXAMPLES 7–9

Five samples of ethylene-propylene copolymers were cross-linked with different aromatic polysulfonazides as follows: To each 100 parts of polymer were added 50 parts of high abrasion furnace black, 5 parts of zinc oxide, 1 part of stearic acid, and 5 parts of aromatic polysulfonazide, moistened with a fraction of a part of paraffin oil. Each mixture was blended on a 2-roll mill at a temperature of 80° C. for 10 minutes and then cured between steel plates under a pressure of 1000 p.s.i. for 60 minutes at a temperature of 177° C. The specific aromatic polysulfonazides used, their solubility in n-heptane at a temperature of 95° C., the mole percentage ethylene and RSV of the ethylene-propylene copolymers cross-linked; and the modulus, tensile strength, and elongation at break of the vulcanizates are tabulated in Table 1.

*Table 1*

| Example | Aromatic Polysulfonazide | Solubility, percent | Copolymer | | Modulus at 300% Elongation, p.s.i. | Tensile Strength, p.s.i. | Elongation at Break, percent |
|---|---|---|---|---|---|---|---|
| | | | Mole Percentage Ethylene | R.S.V. | | | |
| 7_____ | 1,3-Benzene bis(sulfonazide)_____ | 2.0 | 69 | 3.6 | 1,410 | 2,630 | 530 |
| 8_____ | ____do_____ | 2.0 | 67 | 2.6 | 1,430 | 2,365 | 530 |
| 9_____ | 1,6-Bis(4'-sulfonazidophenyl) hexane_____ | 1.6 | 69 | 3.6 | 1,210 | 2,465 | 495 |

It can be seen from the above example that a monosulfonazide produced no cross-linking with an ethylene-propylene copolymer.

EXAMPLE 3

To 100 parts of an ethylene-propylene copolymer containing 88 mole percent of ethylene and having an RSV of 2.7 were added 50 parts of high abrasion furnace black and 4 parts of 1,3-benzene bis(sulfonazide). The mixture was blended on a 2-roll mill at a temperature of 115 to 121° C. for 15 minutes and then cured in a closed iron mold at a temperature of 175° C. for 60 minutes. The resulting vulcanizate was a strong, tough rubber exhibiting no blowing.

EXAMPLE 4

To 100 parts of a high density polyethylene having an RSV of 1.5 were added 50 parts of high abrasion furnace black and 4 parts of 1,3-benzene bis(sulfonazide). The mixture was blended on a 2-roll mill at a temperature of 135 to 150° C. for 10 minutes and extruded through a 1-inch extruder at a temperature of 150 to 160° C. The blend was then cured under a pressure of 1500 p.s.i. for 60 minutes at a temperature of 175° C. The resulting vulcanizate was essentially insoluble in decahydronaph-

EXAMPLE 10

This example shows the cross-linking of an oil-extended black-filled ethylene-propylene copolymer containing 31 mole percentage of ethylene and having an RSV of 3.6. An oil-extended copolymer stock was first prepared by blending 75 parts of polymer with 25 parts of a paraffin oil having a density, $d_4^{20}$ of 0.8704 and a molecular weight of about 420 on a rubber mill by conventional procedure. To 100 parts of the oil-extended polymer were added 6 parts of 1,3-benzene bis(sulfonazide) suspended on 24 parts of high abrasion furnace black and an additional 25 parts of high abrasion furnace black. This mixture was blended and vulcanized as described in Examples 7–9. The resulting vulcanizate had a modulus at 300% elongation of 1080 p.s.i., a tensile strength of 2440 p.s.i., and an elongation at break of 530%.

EXAMPLE 11

This example shows the covulcanization of isobutylene-isoprene copolymer containing 2 mole percent isoprene and an ethylene-propylene copolymer containing 69 mole percent ethylene and having an RSV of 3.6. A blend of the polymers was prepared by blending 50 parts of the isobutylene-isoprene copolymer with 50 parts of the ethylene-propylene copolymer on a rubber mill by conventional procedure. To 100 parts of the blended polymers were added 6 parts of 1,3-benzene bis(sulfonazide) suspended on 24 parts of high abrasion furnace black, an additional 25 parts of high abrasion furnace black, 5 parts of zinc oxide, and 1 part of stearic acid. This mixture was blended and vulcanized as described in Examples 7–9. The resulting vulcanizate had a modulus at 300% elongation of 1730 p.s.i., a tensile strength of 2165 p.s.i., and an elongation at break of 375%.

What we claim and desire to protect by Letters Patent is:

1. A process of cross-linking a polymer containing at least about 25 mole percent of ethylene which comprises heating said polymer in the presence of an aromatic polysulfonazide having a solubility of at least about 1% by weight in n-heptane at a temperature of 95° C. and having all of its sulfonazide groups attached directly to the aromatic nucleus.

2. The process of claim 1 wherein the aromatic polysulfonazide is 1,3-benzene bis(sulfonazide).

3. The process of claim 1 wherein the polymer is polyethylene.

4. The process of claim 1 wherein the polymer is a hydrocarbon copolymer.

5. The process of claim 4 wherein the copolymer is poly(ethylene-propylene).

6. A process of cross-linking an ethylene-propylene copolymer containing at least about 25 mole percent ethylene, which comprises heating said poly(ethylene-propylene) in the presence of 1,3-benzene bis(sulfonazide).

7. A polymer containing at least about 25 mole percent of ethylene cross-linked with an aromatic polysulfonazide having a solubility of at least about 1% by weight in n-heptane at a temperature of 95° C. and having all of its sulfonazide groups attached directly to the aromatic nucleus.

8. The product of claim 7 wherein the aromatic polysulfonazide is 1,3-benzene bis(sulfonazide).

9. The product of claim 7 wherein the polymer is polyethylene.

10. The product of claim 7 wherein the polymer is a hydrocarbon copolymer.

11. The product of claim 10 wherein the copolymer is poly(ethylene-propylene).

12. An ethylene-propylene copolymer containing at least about 25 mole percent ethylene, cross-linked with 1,3-benzene bis(sulfonazide).

References Cited by the Examiner

UNITED STATES PATENTS

| | | | |
|---|---|---|---|
| 2,830,029 | 4/58 | Adams | 260—25 |
| 3,012,016 | 12/61 | Kirk et al. | 260—94.96 |
| 3,058,944 | 10/62 | Breslow et al. | 260—79.3 |
| 3,075,950 | 1/63 | Newland | 260—94.96 |

JOSEPH L. SCHOFER, *Primary Examiner.*

HAROLD N. BURSTEIN, WILLIAM H. SHORT, *Examiners.*